United States Patent
Sjoberg

(10) Patent No.: US 8,250,832 B2
(45) Date of Patent: *Aug. 28, 2012

(54) STRUCTURED BOARDS WITH MATCHED SURFACE

(75) Inventor: Ake Sjoberg, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,750

(22) Filed: Nov. 8, 2010

(65) Prior Publication Data

US 2011/0052887 A1    Mar. 3, 2011

Related U.S. Application Data

(63) Continuation of application No. 10/309,345, filed on Dec. 4, 2002, now Pat. No. 7,829,176.

(30) Foreign Application Priority Data

Dec. 7, 2001   (SE) ...................................... 0104117

(51) Int. Cl.
| | |
|---|---|
| *E04B 1/00* | (2006.01) |
| *E04B 2/00* | (2006.01) |
| *E04F 13/08* | (2006.01) |
| *E04F 13/00* | (2006.01) |
| *B27M 1/00* | (2006.01) |
| *B27L 5/04* | (2006.01) |
| *B27B 1/00* | (2006.01) |
| *B41M 5/00* | (2006.01) |
| *B44C 1/17* | (2006.01) |
| *G03G 7/00* | (2006.01) |
| *D06N 3/00* | (2006.01) |
| *B29C 65/00* | (2006.01) |
| *B32B 37/00* | (2006.01) |
| *B32B 38/04* | (2006.01) |

(52) U.S. Cl. ....... 52/747.1; 52/390; 52/592.1; 52/311.1; 144/329; 144/359; 144/360; 144/363; 144/376; 144/379; 428/195.1; 428/151; 156/258; 156/266; 156/268; 156/293

(58) Field of Classification Search ............... 428/195.1, 428/151

See application file for complete search history.

(56) References Cited

U.S. PATENT DOCUMENTS

| | | | | |
|---|---|---|---|---|
| 2,162,777 | A | * | 6/1939 | Hagopian ........................ 428/81 |
| 3,373,071 | A | * | 3/1968 | Fuerst ........................... 428/451 |
| 5,618,602 | A | * | 4/1997 | Nelson ............................ 428/60 |
| 5,728,476 | A | * | 3/1998 | Harwood et al. ............. 428/500 |
| 2001/0047702 | A1 | * | 12/2001 | Tychsen ............................. 83/13 |

* cited by examiner

*Primary Examiner* — David R Sample
*Assistant Examiner* — Nathan Van Sell
(74) *Attorney, Agent, or Firm* — Jenkins, Wilson, Taylor & Hunt, P.A.

(57) ABSTRACT

Surface structured decorative boards (1) having a first and a second opposite edge ($1^I$ and $1^{II}$ respectively). The board (1) include an upper side decorative surface (2) an upper side surface structure and a base layer. The structure is comprised by at least two surface grades (10) forming a decorative surface pattern on said upper side, said pattern being applied in predetermined fixed positions (P) on the first and the second edges ($1^I$ and $1^{II}$ respectively). The first edge pattern positions ($P^L$) and the second edge pattern positions ($P^R$) are matched so that the pattern continues over the first and second edges ($1^I$ and $1^{II}$ respectively) of adjacent boards (1).

17 Claims, 3 Drawing Sheets

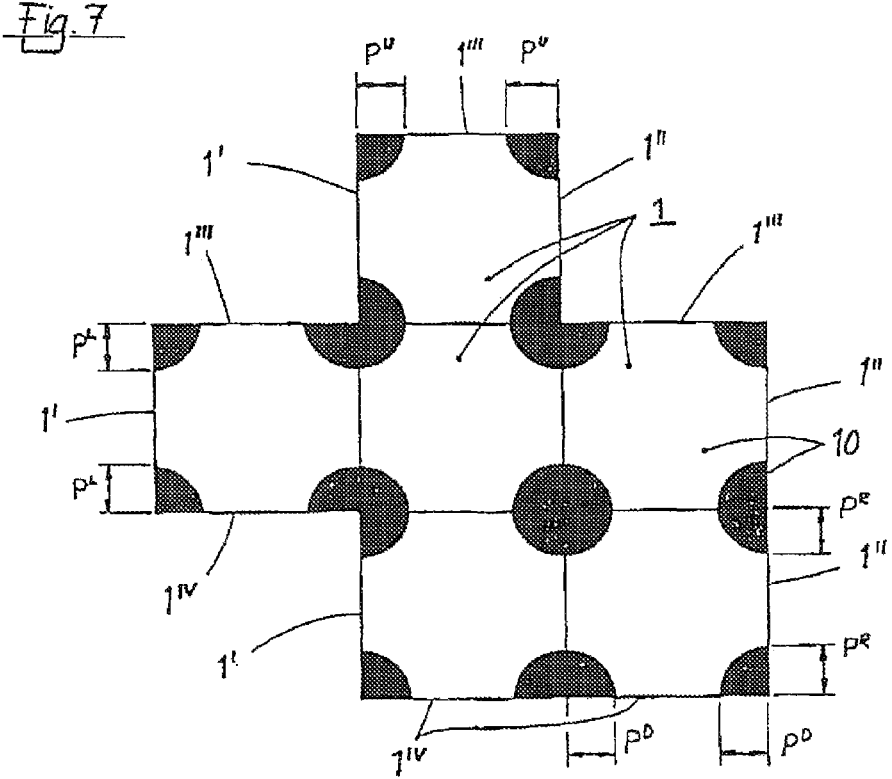
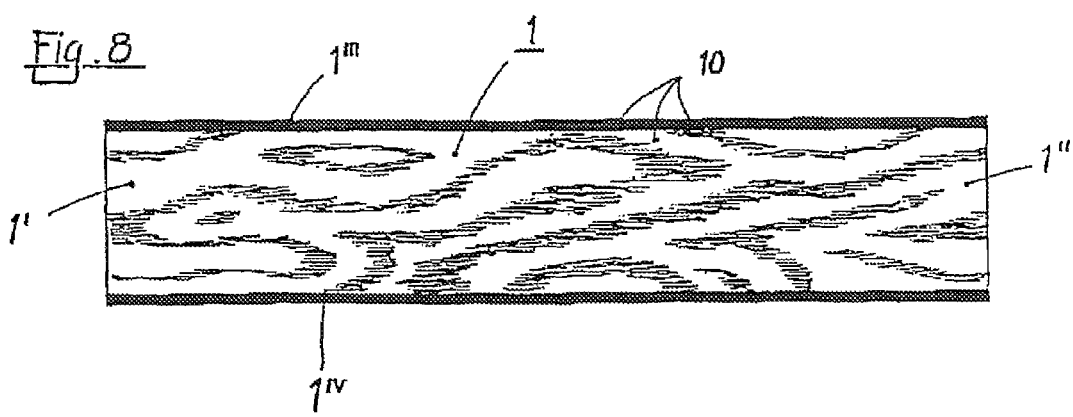

STRUCTURED BOARDS WITH MATCHED SURFACE

CROSS REFERENCE TO RELATED APPLICATIONS

This application is a continuation of Ser. No. 10/309,345, filed Dec. 4, 2002, now U.S. Pat. No. 7,829,176; claiming the benefit of Swedish Application No. 0104117-7, filed Dec. 7, 2001, the entire disclosures of which are incorporated herein by reference.

Products coated with thermosetting laminates are frequent today. They are foremost used where the demand for abrasion resistance is high, but also where resistance towards different chemicals and moisture is required. As an example of such products floors, floor beadings, table tops, work tops and wall panels can be mentioned.

The thermosetting laminate mostly consists of a number of base sheets with a decor sheet placed closest to the surface. The decor sheet can be provided with a desired decor or pattern. The most frequent patterns usually represent the image of different kinds of wood, or minerals such as marble or granite. The surface of the laminate can be provided with a structure during the laminating procedure which will make the decor more realistic. Press plates with structure or structure foils are frequently used when manufacturing such a laminate. A negative reproduction of the structure in the press plate or the foil will be imprinted into the laminate during the laminating procedure.

The structure suitably represents features characteristic for the pattern the decor represents in the laminate. The structure can be made coarse to simulate for example roughly planed stone, or smooth with randomly placed pits and micro cracks to simulate polished marble. A wood surface can for example be simulated by providing the surface with randomly placed thin oblong indentations which imitate pores. These indentations must be oriented in the direction of the growth of the simulated wood, which is indicated by the pattern of the grains, in order to make the result realistic.

It has for a long time been a great need to be able to manufacture a decorative thermosetting laminate with a decor pattern with a surface structure as life like as the decor reproduced.

According to the present invention the above mentioned needs have been met and a decorative board with a decorative surface with a matching surface structure that overlaps the joints of adjacent boards has been achieved. The invention relates to surface structured decorative boards having a first and a second opposite edge. The boards is also provided with further edges adjacent to said first and the second edge. The boards include an upper side decorative surface an upper side surface structure and a base layer. The invention is characterised in that the structure is comprised by at least two surface grades forming a decorative surface pattern on said upper side. Said pattern is applied in predetermined fixed positions on the first and the second edges. The first-edge pattern positions and the second edge pattern positions are matched so that the pattern continues over the first and second edges of adjacent boards. This means that the pattern close to the first and second edges are matched so that the boards of a selected range will match giving an impression that the structure pattern continues from one board to another. The pattern of the remaining part of the board is suitably different from one board to another to create a lifelike impression.

According to one embodiment of the invention the boards are also provided a third and a fourth edge having a pattern being applied in predetermined fixed positions on said third and fourth edges. The third edge pattern positions and the fourth edge pattern positions are matched so that the pattern continues over the third and fourth edges of adjacent boards.

A surface structured decorative boards according to the present invention suitably has a decorative surface which contains a number of conventional dry base layer paper webs or base layer paper sheets which are impregnated with a thermosetting resin wherein the resin in the uppermost of these preferably is melamine-formaldehyde resin while the rest of the webs or sheets possibly contain melamine-formaldehyde resin or phenol-formaldehyde resin, wherein the decor paper web or decor paper sheet respectively, is placed on top of the conventional base layer webs or base layer sheets after which the different paper webs or a stack of sheets respectively are continuously or discontinuously laminated together at an elevated pressure and an elevated temperature. The surface layer of the laminate may also include a so called overlay paper, placed on top of the decor paper. Such an overlay paper is preferably impregnated with melamine-formaldehyde resin. At least one of the thermosetting resin impregnated sheets, preferably the uppermost one is suitably coated with hard particles, for example silica, aluminium oxide and/or silicon carbide with an average size of 1-100 µm, preferably around 5-60 µm. The upper side decorative surface is suitably constituted of a decorative layer and a ionomeric polymer. Alternatively the upper side decorative surface is constituted of a decorative layer, a ionomeric polymer and hard particles. According to yet another alternative of the invention the upper side decorative surface is constituted of a decorative layer, a ionomeric polymer, overlay paper, impregnated with melamine formaldehyde and hard particles. The decorative layer is suitably made of paper.

According to one embodiment of the invention the decor pattern consists of a number of sections of parallel rows of bars, where the bars in adjoining rows are mutually offset in the longitudinal direction. A demarcation consisting of a 1-20 mm wide, preferably 3-10 mm wide, field without any surface structure may be used between adjacent structure areas. Alternatively, a demarcation consisting of a 1-20 mm wide, preferably 3-10 mm wide, field were one surface structure gradually transforms into another surface structure is used.

Predetermined fixed positions of the structure pattern adjacent the edges preferably extends over a matching tolerance distance. This matching tolerance distance is suitably in the range 1-20 mm, preferably in the range 1-10 mm and most preferably in the range 1-5 mm.

The surface grades used for achieving the pattern is selected from the group consisting of; groups of small oblong indentations, different grades of gloss to flat surface finish, ridges and recesses and combinations thereof.

According to one embodiment of the invention the base layer may consist of a number of conventional dry base layer paper webs or base layer paper sheets which are impregnated with a thermosetting resin. The resin in the uppermost of these is preferably while the rest of the webs or sheets for example may contain melamine-formaldehyde resin or phenol-formaldehyde resin. The decor paper web or decor paper sheet respectively, is hereby placed on top of the conventional base layer webs or base layer sheets after which the different paper webs or a stack of sheets respectively are continuously or discontinuously laminated together at an elevated pressure and an elevated temperature.

The surface layer of the may suitably include a so called overlay paper. placed on top of the decor paper. The overlay paper is suitably impregnated with melamine-formaldehyde resin. At least one of the thermosetting resin impregnated sheets, preferably the uppermost one is preferably coated with hard particles, for example silica, aluminium oxide and/or silicon carbide with an average size of 1-100 μm, preferably around 5-60 μm.

The overlay may alternatively be replaced by, or used together with, a layer of ionomeric polymer where the polymer for example is constituted of ethylene-methacrylate acid-copolymer while the ions for example are constituted of sodium, zinc or lithium even though other ionomeric polymers are usable. It is also in this embodiment suitable to utilise hard particles as described above.

According to one embodiment of the invention the base layer consists of a particle board or a fibre board. Such a base layer may be 5-20 mm thick.

A board according to the invention may for example be used as a floor board, a wall panel or a ceiling panel. The most popular decor used on floor boards is different kinds of wood as for example oak, birch, beech, ash, cherry, maple, walnut, pine, rosewood, mahogany or ebony. Also minerals like marble, granite, sandstone, soapstone and ceramic materials are popular reproductions. The surface structures use for simulating surfaces to mach the above materials may comprise narrow oblong indentations in the surface of 0.1-1 mm width and 0.1-1 mm depth which may simulates pores, and cracks of wood. Wood grain may be simulated by sweeping patterns of indentations of 1-25 mm width and 0.1-2 mm depth. It is also possible to provide the surface with combinations of gloss and flat surfaces in sections which additionally may be raised or recessed.

The invention is further explained in connection to the accompanying drawings showing different embodiments of the invention where, FIG. 1 shows schematically an embossed surface structured decorative board 1 in the form of a floor board according to an embodiment of the invention.

FIG. 7 shows schematically parts of several adjacent surface structured decorative board 1 having a first and a second opposite edge, respectively, as well as third and fourth opposite edges, respectively, according to one embodiment of the invention.

Figure 1:
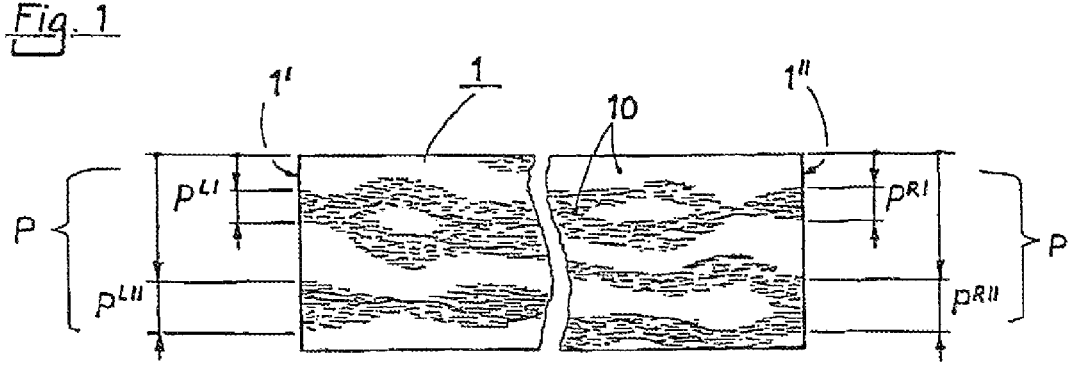

FIG. 8 shows schematically a surface structured decorative board 1 having a first and a second opposite edge respectively according to a second embodiment of the invention Accordingly, FIG. 1 schematically shows parts of a surface structured decorative board 1 having a first and a second opposite edge $1^I$ and $1^{II}$ respectively according to a first embodiment of the invention. The board 1 includes an upper side decorative surface, an upper side surface structure and a base layer. The structure is comprised by two surface grades 10 forming a decorative surface pattern on said upper side. One of the surface grades 10 is a plane semi-gloss surface while the other surface grade 10 is composed of clusters of narrow oblong indentations simulating pores in wood. The pattern is applied in predetermined fixed positions P on the first and the second edges $1^I$ and $1^{II}$ respectively. The first edge pattern positions $P^L$ and the second edge pattern positions $P^R$ are matched so that the pattern continues over the first and second edges $1^I$ and $1^{II}$ respectively of adjacent boards 1. The boards 1 are most often manufactured in larger formats containing several decorative boards 1 which are cut into the desired format and provided with edges. These edge are provided with joining functionality like tongue and groove. The large format panels are provided with decor and structure prior to being cut into user format decorative boards 1. The predetermined fixed positions P extends over a matching tolerance distance D (see FIG. 6). This matching tolerance distance D is foremost used for ensuring a matching of the structure pattern on the first and second edges as cutting and manufacturing tolerance otherwise could hamper such matching. An area C (see FIG. 6) is removed during the cutting and milling operation when the boards 1 is provided with their end user format. The matching tolerance distance D is suitably in the range 1-5 mm.

Figure 2:
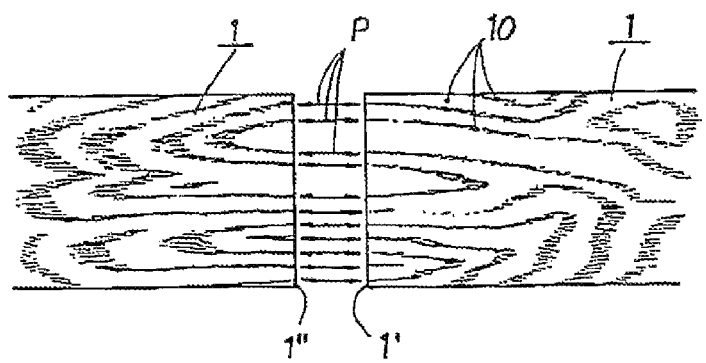
FIG. 2 shows schematically end parts of two surface structured decorative boards 1 according to an embodiment of the invention.

FIG. 2 shows schematically parts of two adjacent surface structured decorative board 1 having a first and a second opposite edge $1^I$ and $1^{II}$ respectively according to a second embodiment of the invention. The boards 1 include an upper side decorative surface, an upper side surface structure and a base layer. The structure is comprised by two surface grades 10 forming a decorative surface pattern on said upper side. One of the surface grades 10 is a plane semi-gloss surface while the other surface grade 10 is composed of clusters of narrow oblong indentations simulating wood pores in sweeping wood grain pattern. The dark sections of the drawing are to be interpreted as indented surfaces. The pattern is applied in predetermined fixed positions P on the first and the second edges $1^I$ and $1^{II}$ respectively. The first edge pattern positions $P^L$ (see FIG. 1) and the second edge pattern positions $P^R$ (see FIG. 1) are matched so that the pattern continues over the first and second edges $1^I$ and $1^{II}$ respectively of adjacent boards 1.

Figure 3:
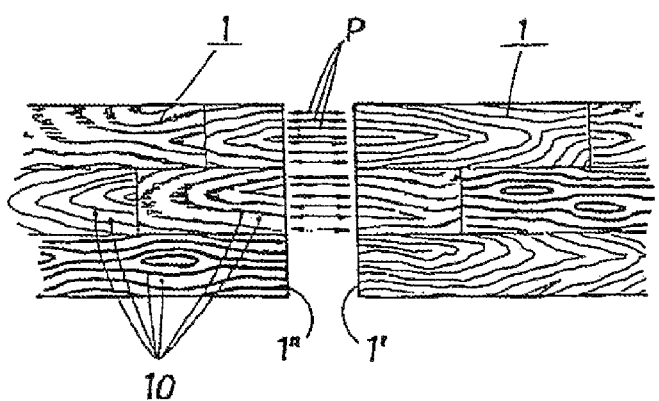
FIG. 3 shows schematically end parts of two surface structured decorative boards 1 according to another embodiment of the invention.

FIG. 3 shows schematically parts of two adjacent surface structured decorative board 1 having a first and a second opposite edge $1^I$ and $1^{II}$ respectively according to a third embodiment of the invention. The boards 1 include an upper side decorative surface, an upper side surface structure and a base layer. The structure simulates three parallel rows of bars, where the bars in adjoining rows are mutually offset in the longitudinal direction. The structure is comprised by four surface grades 10 forming a decorative surface pattern on said upper side. A first main surface grade 10 is a plane semi-gloss surface while the other surface grades are composed of clusters of narrow oblong indentations, narrow indented lines and heavier lines, all simulating wood grain pattern. The dark sections of the drawing are to be interpreted as indented surfaces and are also provided with a flat surface finish to enhance the visual effect. The pattern is applied in predetermined fixed positions P on the first and the second edges $1^I$ and $1^{II}$ respectively. The first edge pattern positions $P^L$ (see FIG. 1) and the second edge pattern positions $P^R$ (see FIG. 1) are matched so that the pattern continues over the first and second edges $1^I$ and $1^{II}$ respectively of adjacent boards 1.

Figure 4:
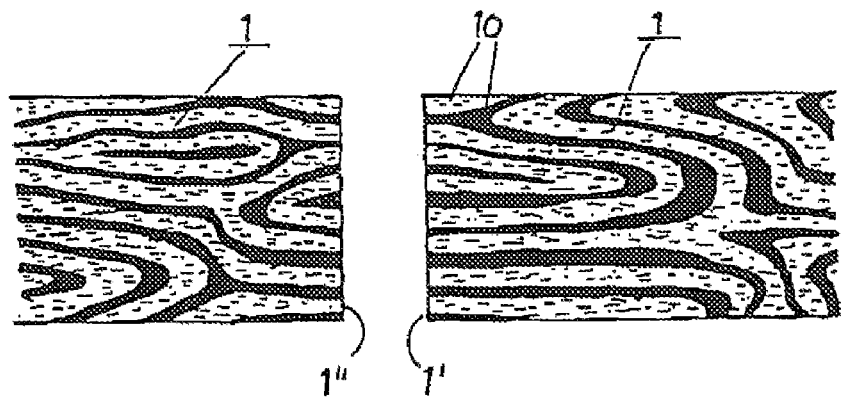
FIG. 4 shows schematically end parts of two surface structured decorative boards 1 according to yet another embodiment of the invention.

FIG. 4 shows schematically parts of two adjacent surface structured decorative board 1 having a first and a second opposite edge $1^I$ and $1^{II}$ respectively according to a fourth embodiment of the invention. The boards 1 include an upper side decorative surface, an upper side surface structure and a base layer. The structure is comprised by three surface grades 10 forming a decorative surface pattern on said upper side. A first main surface grade 10 is a plane semi-gloss surface while the other surface grades 10 are composed of randomly arranged narrow oblong indentations and wide indented sweeping lines, all simulating wood grain pattern. The dark sections of the drawing are to be interpreted as indented surfaces and are also provided with a flat surface finish to enhance the visual effect. The pattern of the wide sweeping lines are applied in predetermined fixed positions P on the first and the second edges $1^I$ and $1^{II}$ respectively (see FIG. 1). The first edge pattern positions $P^L$ (see FIG. 1) and the second edge pattern positions $P^R$ (see FIG. 1) are matched so that the pattern continues over the first and second edges $1^I$ and $1^{II}$ respectively of adjacent boards 1.

Figure 5:
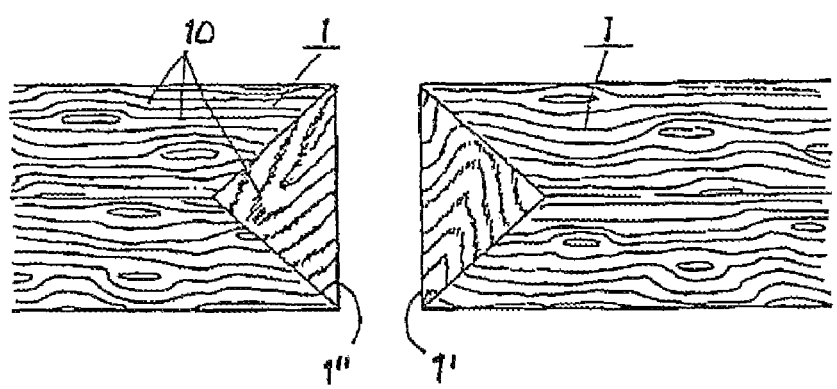
FIG. 5 shows schematically end parts of two surface structured decorative boards 1 according to yet another embodiment of the invention.

FIG. 5 shows schematically parts of two adjacent surface structured decorative board 1 having a first and a second opposite edge $1^I$ and $1^{II}$ respectively according to a fifth embodiment of the invention. The boards 1 include an upper side decorative surface, an upper side surface structure and a base layer. The structure is comprised by three surface grades 10 forming a decorative surface pattern on said upper side. A first main surface grade 10 is a plane semi-gloss surface while the other surface grades 10 are composed of randomly arranged narrow oblong indentations and narrow indented sweeping lines, all simulating wood grain pattern. The dark sections of the drawing are to be interpreted as indented surfaces. The pattern of the wide sweeping lines are applied in predetermined fixed positions P on the first and the second edges $1^I$ and $1^{II}$ respectively (see FIG. 1). The first edge pattern positions $P^L$ (see FIG. 1) and the second edge pattern positions $P^R$ (see FIG. 1) are matched so that the pattern continues over the first and second edges $1^I$ and $1^{II}$ respectively of adjacent boards 1.

Figure 6:
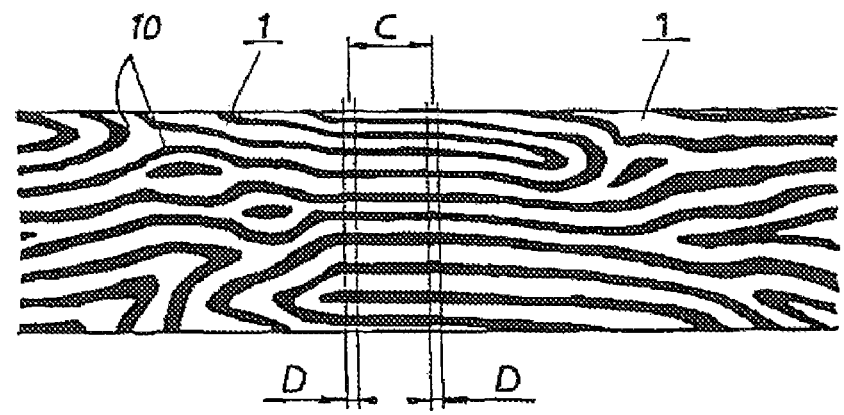
FIG. 6 shows schematically end parts of two surface structured decorative boards 1 according the invention. The boards are shown before cutting.

FIG. 6 is to be studied together with FIG. 1.

FIG. 7 shows schematically parts of several adjacent surface structured decorative board 1 having a first and a second opposite edge $1^I$ and $1^{II}$ respectively as well as third and fourth opposite edges $1^{III}$ and $1^{IV}$ respectively according to a special embodiment of the invention. The boards 1 include an upper side decorative surface, an upper side surface structure and a base layer. The structure is comprised by two surface grades 10 forming a decorative surface pattern on said upper side. A first main surface grade 10 is a rough flat surface while the other surface grade 10 is a gloss surface. The dark sections of the drawing are to be interpreted as indented surfaces. The pattern is applied in predetermined fixed positions P (see FIG. 1) on the first, second third and fourth edges $1^I$, $1^{II}$, $1^{III}$ and $1^{IV}$ respectively. The first edge pattern positions $P^L$ (see also FIG. 1) and the second edge pattern positions $P^R$ (see also FIG. 1) as well as the third edge pattern positions $P^U$ and the fourth edge pattern positions $P^D$ are matched so that the pattern continues over the first, second, third and fourth edges $1^I$, $1^{II}$, $1^{III}$ and $1^{IV}$ respectively of adjacent boards 1.

FIG. 8 shows schematically a surface structured decorative board 1 having a first and a second opposite edge $1^I$ and $1^{II}$ respectively according to a second special embodiment of the invention. The boards 1 include an upper side decorative surface, an upper side surface structure and a base layer. The structure is comprised by two main surface grades 10 forming a decorative surface pattern on said upper side. A first main surface grade 10 is a plane semi-gloss surface while the other main surface grade 10 is composed of randomly arranged narrow oblong indentations arranged in sweeping lines simulating wood grain pattern. The dark sections of the drawing are to be interpreted as indented surfaces and are also provided with a flat surface finish to enhance the visual effect. The pattern of the wide sweeping lines are applied in predetermined fixed positions P on the first and the second edges $1^I$ and $1^{II}$ respectively (see FIG. 1). The first edge pattern positions $P^L$ (see FIG. 1) and the second edge pattern positions $P^R$ (see FIG. 1) are matched so that the pattern continues over the first and second edges $1^I$ and $1^{II}$ respectively of adjacent boards 1. The third and fourth edges $1^{III}$ and $1^{IV}$ respectively are provided with a longitudinal indented line intended to simulate a seam. The line has a flat surface finish.

The invention is not limited by the shown embodiments since they can be varied in different ways within the scoop of the invention. It is for example the intended that the structure pattern according to the invention is to be used together with decorative sheets which simulates for example different kinds of wood. It is also possible to simulate the structure of other materials and match them in a way as described above. Such pattern may be fabric, minerals like polished marble or even completely fantasy based patterns.

The invention claimed is:

1. A process for forming a decorative laminate surface from an assembly of user format laminate boards comprising:
   (a) providing a large format board having an upper side decorative surface and a base layer;
   (b) said upper side decorative surface being provided with at least two surface grades;
   (c) said two surface grades comprising a continuous pattern over a matching tolerance distance D;
   (d) cutting said large format board across said matching tolerance distance D to form at least two user format decorative laminate boards, whereby the edge formed by said cutting provides at least two surface grades extending to the cut edge of said user format decorative laminate board;
   (e) assembling a first user format decorative laminate board with a second user format decorative laminate board thereby forming a joint between said assembled boards;
   (f) aligning at least two of the surface grades of the first user format decorative laminate board with similar surface grades on the second user format laminate board such that the surface grades appear to bridge the joint without interruption to form said decorative laminate surface.

2. The process of claim 1, wherein at least one of the user format decorative boards has a first, second, third and fourth edge.

3. The process of claim 2, wherein the first and second edges are opposite one another.

4. The process of claim 3, wherein the first and second edges are provided with at least one of a tongue and a groove.

5. The process according to claim 4, wherein the decorative surface is applied to the base layer before the at least one tongue and groove are provided.

6. The process according to claim 5, wherein the decorative surface and base layer are cut to form the at least one of the tongue and groove.

7. The process according to claim 6, wherein the large format board is provided, prior to cutting, with two matching tolerance distances separated by an area C; and further comprising cutting the large format board at each of said two matching tolerance distances thereby removing area C such that cutting does not impair the alignment of the surface grades of adjacent boards.

8. The process according to claim 1, wherein the matching tolerance in the range of 1-20 mm.

9. The process of claim 1, wherein the decorative surface of said large format board is formed by lamination of a decor layer with a wear layer, wherein the wear layer comprises an overlay paper impregnated with a plastic.

10. The process of claim 9, wherein at least the wear layer contains hard particles.

11. The process of claim 1, wherein the decorative surface of said large format board is formed by lamination of a decor layer with a wear layer, wherein the wear layer comprises an ionomeric polymer.

12. The process of claim 11, wherein at least the wear layer contains hard particles.

13. The process of claim 1, wherein the base layer comprises a wood based material.

14. The process of claim 1, wherein the base layer is selected from particle board or fiber board.

15. The process of claim 2, further comprising assembling a third and a fourth user format board to the user format board having a first, second, third and fourth edge.

16. The process of claim 1, wherein at least one of the surface grades is an indentation in the surface of the board and is positioned at the intersection of adjacent edges of the first user format decorative laminate board.

17. The process of claim 1, wherein at least one of the surface grades is an indentation in the surface of the board and is positioned at the intersection of adjacent edges of the second user format decorative laminate board.

* * * * *